United States Patent
Dobizl et al.

(10) Patent No.: US 10,870,091 B2
(45) Date of Patent: Dec. 22, 2020

(54) SYSTEM FOR DISSOLVING SOLID CHEMICALS AND GENERATING LIQUID SOLUTIONS

(71) Applicant: Ecolab USA Inc., Saint Paul, MN (US)

(72) Inventors: Kenneth Thomas Dobizl, Mounds View, MN (US); Amit Gupta, Aurora, IL (US); Alessandro Culotti, Chicago, IL (US); Joshua James Lanz, Rochester, MN (US); Trishul Artham, Pune (IN)

(73) Assignee: Ecolab USA Inc., Saint Paul, MN (US)

( * ) Notice: Subject to any disclaimer, the term of this patent is extended or adjusted under 35 U.S.C. 154(b) by 49 days.

(21) Appl. No.: 16/274,789

(22) Filed: Feb. 13, 2019

(65) Prior Publication Data

US 2019/0247807 A1  Aug. 15, 2019

Related U.S. Application Data

(60) Provisional application No. 62/630,023, filed on Feb. 13, 2018.

(51) Int. Cl.
  *B01F 1/00* (2006.01)
  *B01F 5/10* (2006.01)
  (Continued)

(52) U.S. Cl.
  CPC .......... *B01F 1/0038* (2013.01); *B01F 1/0033* (2013.01); *B01F 5/10* (2013.01);
  (Continued)

(58) Field of Classification Search
  CPC ........ B01F 1/00; B01F 1/0022; B01F 1/0027; B01F 1/0033; B01F 1/0038; B01F 5/00;
  (Continued)

(56) References Cited

U.S. PATENT DOCUMENTS

| | | |
|---|---|---|
| 3,511,409 A | 5/1970 | Huck |
| 3,516,536 A | 6/1970 | Ino |

(Continued)

FOREIGN PATENT DOCUMENTS

| | | |
|---|---|---|
| BR | MU8600815 Y1 | 7/2015 |
| CH | 679374 A5 | 2/1992 |

(Continued)

OTHER PUBLICATIONS

International Patent Application No. PCT/US2019/017812, International Search Report and Written Opinion dated Jun. 3, 2019, 15 pages.

(Continued)

*Primary Examiner* — Natasha E Young
(74) *Attorney, Agent, or Firm* — Fredrikson & Byron, P.A.

(57) ABSTRACT

A system for dissolving solid chemical may include three reservoirs positioned in a vertically stacked arrangement. A solid chemical reservoir configured to receive solid chemical to be dissolved may be nested in a solution generator reservoir into which water is introduced to erode the solid chemical. A dissolved chemical reservoir can be positioned under the solid chemical reservoir and the solution generator reservoir. The dissolved chemical reservoir can store solution generated using the system. In some examples, a recirculation circuit is used to recirculate water introduced into the solution generator reservoir until a solution having a target concentration of the chemical being dissolved is achieved. The recirculation circuit may include a recirculation line having an outlet aimed at the bottom wall of the solid chemical reservoir.

20 Claims, 10 Drawing Sheets

(51) Int. Cl.
*B01F 15/00* (2006.01)
*B01J 4/00* (2006.01)

(52) U.S. Cl.
CPC .... *B01F 15/0022* (2013.01); *B01F 15/00155* (2013.01); *B01F 15/00253* (2013.01); *B01F 15/00344* (2013.01); *B01J 4/008* (2013.01); *B01F 2001/0044* (2013.01); *B01F 2001/0088* (2013.01)

(58) Field of Classification Search
CPC ...... B01F 5/10; B01F 15/00; B01F 15/00123; B01F 15/00129; B01F 15/00155; B01F 15/00207; B01F 15/0022; B01F 15/00253; B01F 15/00331; B01F 15/00344; B01F 2001/00; B01F 2001/0044; B01F 2001/0072; B01F 2001/0088; B01J 4/00; B01J 4/008
See application file for complete search history.

(56) References Cited

U.S. PATENT DOCUMENTS

| | | |
|---|---|---|
| 3,833,147 A | 9/1974 | Borsum et al. |
| 4,040,515 A | 8/1977 | Hessel et al. |
| 4,199,001 A | 4/1980 | Kratz |
| 4,216,885 A | 8/1980 | Sedam |
| 4,250,911 A | 2/1981 | Kratz |
| 4,595,520 A | 6/1986 | Heile et al. |
| 4,676,399 A | 6/1987 | Burckhardt |
| 4,680,134 A | 7/1987 | Heile et al. |
| 4,691,732 A | 9/1987 | Johnson et al. |
| RE32,763 E | 10/1988 | Fernholtz et al. |
| RE32,818 E | 1/1989 | Fernholz et al. |
| 4,830,509 A | 5/1989 | Gulmatico |
| 4,984,709 A | 1/1991 | Weinstein |
| 5,009,561 A | 4/1991 | Lombardino et al. |
| 5,230,433 A | 7/1993 | Hamilton et al. |
| 5,268,153 A | 12/1993 | Muller |
| 5,316,688 A | 5/1994 | Gladfelter et al. |
| 5,560,516 A | 10/1996 | Hinterreiter |
| 5,961,845 A | 10/1999 | List et al. |
| 5,979,696 A | 11/1999 | Bode et al. |
| 6,177,392 B1 | 1/2001 | Lentsch et al. |
| 6,309,538 B1 | 10/2001 | Khan |
| 6,337,024 B1 * | 1/2002 | Hammonds ............... B01F 1/00 137/1 |
| 6,432,359 B1 | 8/2002 | Carey et al. |
| 6,435,231 B1 | 8/2002 | Cooper et al. |
| 6,451,271 B1 | 9/2002 | Hammonds |
| 6,779,539 B1 | 8/2004 | Schwamberger et al. |
| 6,910,579 B2 | 6/2005 | Reinke et al. |
| 7,059,759 B2 | 6/2006 | Hummer |
| 7,300,196 B2 | 11/2007 | Fleig |
| 7,703,621 B2 | 4/2010 | Evans et al. |
| 7,810,987 B2 | 10/2010 | Hildreth |
| 8,889,048 B2 | 11/2014 | Stolte et al. |
| 9,452,457 B2 | 9/2016 | Denvir et al. |
| 2002/0195404 A1 | 12/2002 | Pickens et al. |
| 2004/0154984 A1 | 8/2004 | Dafny et al. |
| 2006/0048841 A1 | 3/2006 | Luehrsen et al. |
| 2008/0296214 A1 | 12/2008 | Blanchette |
| 2009/0308889 A1 | 12/2009 | Lindsay et al. |
| 2011/0036454 A1 | 2/2011 | Saito et al. |
| 2011/0168608 A1 | 7/2011 | Gaffey |
| 2012/0067968 A1 * | 3/2012 | Brennan ............... B01F 5/0268 239/9 |
| 2012/0138544 A1 | 6/2012 | Barani |
| 2013/0098820 A1 | 4/2013 | King et al. |
| 2014/0054210 A1 | 2/2014 | King et al. |
| 2014/0084018 A1 | 3/2014 | Onillon et al. |
| 2017/0052051 A1 | 2/2017 | Emmert |

FOREIGN PATENT DOCUMENTS

| | | |
|---|---|---|
| DE | 3143953 A1 | 5/1983 |
| EP | 176960 A2 | 4/1986 |
| EP | 236039 A2 | 9/1987 |
| EP | 1118588 A2 | 7/2001 |
| EP | 834472 B1 | 12/2002 |
| EP | 1961668 A1 | 8/2008 |
| FR | 2750780 A1 | 1/1998 |
| FR | 2898114 A1 | 9/2007 |
| FR | 2935691 A1 | 3/2010 |
| GB | 1228062 A | 4/1971 |
| JP | 2009286435 A | 12/2009 |
| JP | 2012171683 A | 9/2012 |
| JP | 2012171685 A | 9/2012 |
| JP | 2013079090 A | 5/2013 |
| SU | 1193012 A2 | 11/1985 |
| SU | 1219415 A1 | 3/1986 |
| WO | 8500156 A1 | 1/1985 |
| WO | 9117103 A1 | 11/1991 |
| WO | 9318985 A1 | 9/1993 |
| WO | 9728066 A1 | 8/1997 |
| WO | 0029306 A1 | 5/2000 |
| WO | 0063087 A1 | 10/2000 |
| WO | 0103796 A1 | 1/2001 |
| WO | 0123065 A1 | 4/2001 |
| WO | 03013962 A1 | 2/2003 |
| WO | 03086901 A1 | 10/2003 |
| WO | 2005004785 A2 | 1/2005 |
| WO | 2005044436 A1 | 5/2005 |
| WO | 2007039779 A1 | 4/2007 |
| WO | 2007125353 A1 | 11/2007 |
| WO | 2008089306 A2 | 7/2008 |
| WO | 2009080309 A2 | 7/2009 |
| WO | 2011157298 A1 | 12/2011 |
| WO | 2014033080 A1 | 3/2014 |
| WO | 2016010352 A1 | 1/2016 |

OTHER PUBLICATIONS

Dickason et al., "RingCap Technology," Drugs and the Pharmaceutical Sciences, vol. 126, Modified-Release Drug Delivery Technology, 2003, Section 5, pp. 49-57.

* cited by examiner

SYSTEM FOR DISSOLVING SOLID CHEMICALS AND GENERATING LIQUID SOLUTIONS

RELATED MATTERS

This application claims priority to U.S. Provisional Patent Application No. 62/630,023, filed Feb. 13, 2018, the entire contents of which are incorporated herein by reference.

TECHNICAL FIELD

This disclosure relates to systems for dissolving solid chemicals to generate liquid solutions.

BACKGROUND

Chemical product dispensers are useful in many different chemical application systems, including water treatment systems like commercial cooling water systems, cleaning systems relating to food and beverage operations, laundry operations, warewashing operations (e.g., dishwashers), pool and spa maintenance, as well as other systems, such as medical operations. For example, chemical products used in water treatment systems may include oxidizing and non-oxidizing biocides to inhibit or destroy growth or activity of living organisms in the water being treated. As another example, chemical products used in food and beverage operations may include sanitizers, sterilants, cleaners, degreasers, lubricants, etc. Chemical products used in a warewashing or laundry operation may include detergent, sanitizers, stain removers, rinse agents, etc. Chemical products used in a laundry operation may include detergent, bleaches, stain removers, fabric softeners, etc. Chemical products used in cleaning of medical/surgical instrumentation may include detergents, cleaning products, neutralizers, sanitizers, disinfectants, enzymes, etc.

For low volume and non-commercial applications, chemical products are often provided in ready-to-use form. The chemical product may be formulated at the correct concentration for the intended application and may be applied directly without diluting or otherwise modifying the chemical composition of the product. In other applications, such as high-volume use facilities and commercial applications, a desired chemical product may be formed on site from one or more concentrated chemical components. The concentrated chemical may be introduced into a dispenser system where the chemical is contacted with water to form a dilute, ready-to-use solution.

SUMMARY

In general, this disclosure is directed to devices, systems, and techniques for generating liquid solutions from concentrated solid chemicals. In some examples, the generator system includes three reservoirs provided within a common housing to facilitate ready transport and deployment of the generator system. For example, the system may include a solid chemical reservoir configured to receive solid chemical to be dissolved that is nested within a solution generator reservoir into which water is introduced to erode the solid chemical. The system may also include a dissolved chemical reservoir that can receive and store solution generated using the system. The generator system may operate to introduce water into the solution generator reservoir and thereby dissolve solid chemical within the solid chemical reservoir nested therein. Solution can be generated from the solid chemical on demand (e.g., in real time) as the solution is withdrawn from the generator and used. Additionally or alternatively, solution can be generated from the solid chemical to periodically refill the dissolved chemical reservoir, e.g., when the level of the dissolved chemical reservoir falls below a threshold level and/or when the dissolved chemical reservoir is evacuated to replace expired solution with fresh solution.

While the generator system can have a variety of different configurations as described herein, in some examples, the generator includes a recirculation circuit. In some examples, the recirculation circuit is used to recirculate water introduced into the solution generator reservoir until a solution having a target concentration of the chemical being dissolved is achieved. For example, a fixed or set volume of water may be initially introduced into the generator. The fixed volume of water may then be recirculated, e.g., by withdrawing the water (or solution being formulated upon initial dissolution of solid chemical) from the solution generator reservoir and reintroducing the water a plurality of times. This can increase the erosion of solid chemical in the solid chemical reservoir (e.g., as compared to if the water (or solution being formulated) is not recirculated), progressively increasing the concentration of the chemical being dissolved until a target concentration is reached.

In some configurations, the recirculation circuit may include a recirculation line having an outlet aimed at the bottom wall of the solid chemical reservoir. As water (or solution being formulated) is recirculated through the generator, the water may discharge from the outlet and impinge against the bottom wall of the solid chemical reservoir before contacting any other solid surfaces within the solution generator reservoir. The bottom wall of the solid chemical reservoir may have one or more openings that allow the water to flow through the solution generator reservoir and into the solid chemical reservoir and interact (e.g., erode) solid chemical therein. Without wishing to be bound by any particular theory, it has been found that, in some configurations, aiming the outlet of the recirculation line at the bottom wall of the solid chemical reservoir results in the solid chemical therein eroding more efficiently and uniformly than if the outlet is positioned so the that recirculating water indirectly flows to the solid chemical reservoir.

In one example, a system for dissolving solid chemical is described. The system includes a solid chemical reservoir, a solution generator reservoir, and a dissolved chemical reservoir. The solid chemical reservoir is configured to receive solid chemical to be dissolved and has a porous bottom wall and at least one sidewall extending vertically upwardly from the porous bottom wall. The solution generator reservoir surrounds the porous bottom wall and at least a portion of the sidewall of the solid chemical reservoir. The solution generator has an opening through which dissolved chemical generated in the solution generator reservoir is configured to be discharged. The dissolved chemical reservoir is in selective fluid communication with the solution generator via the outlet opening. The example system also includes a recirculation circuit and a controller. The recirculation circuit includes a recirculation pump and a recirculation line having an outlet aimed at the porous bottom wall. The pump is configured to draw fluid from the solution generator reservoir and discharge the fluid through the outlet of the recirculation line. The controller is configured to: control addition of water to the solution generator reservoir at least until the porous bottom wall of the solid chemical reservoir is submerged in the water, control the recirculation circuit to recirculate fluid in the solution generator reservoir to generate a solution having a target concentration of the solid chemical via erosion of solid chemical in the solid chemical reservoir, and control discharge of the solution to the dissolved chemical reservoir.

In another example, a method is described that includes introducing water into a solution generator reservoir that surrounds a porous bottom wall and at least a portion of a sidewall of a solid chemical reservoir containing solid chemical to be dissolved. The water is introduced until a height of water in the solution generator wets some but not all of the solid chemical in the solid chemical reservoir. The example method includes recirculating fluid in the solution generator reservoir by drawing fluid out of the solution generator reservoir with a pump and reintroducing the fluid into the solution generator through a recirculation line having an outlet aimed at the porous bottom wall of the solid chemical reservoir. The fluid is recirculated until a solution having a target concentration is generated via erosion of solid chemical in the solid chemical reservoir. The example method also involves discharging the solution from the solution generator reservoir into a dissolved chemical reservoir.

The details of one or more examples are set forth in the accompanying drawings and the description below. Other features, objects, and advantages will be apparent from the description and drawings, and from the claims.

DETAILED DESCRIPTION

A variety of chemicals are provided to end users in concentrated form to reduce the weight and volume of the chemicals during shipping and storage. Once delivered to a location of intended use, however, a concentrated chemical is combined with a diluent such as water to produce a diluted chemical solution, which may be referred to as a use solution or just "solution" herein. Depending on the composition of the concentrated chemical, the use solution can be used for any number applications such as hard surface sanitation, food and beverage operations, laundry operations, warewashing operations, water treatment operations (e.g., cooling tower biocidal control), pool and spa maintenance, agricultural operations, and the like.

In general, this disclosure describes chemical dilution systems (also referred to as chemical generator systems) and techniques. In some examples, the system includes a solid chemical reservoir that holds solid chemical to be dissolved to form a target solution. The solid chemical reservoir may be partially or fully enclosed within a solution generator reservoir that is filled with diluent to erode the solid chemical and form the solution. A recirculation circuit may be provided that recirculates the diluent initially introduced into the solution generator reservoir until the diluent has dissolved an amount of the solid chemical in the solid chemical reservoir effective to form solution having the target concentration of the dissolved solid chemical. Thereafter, the solution may be discharged from the solution generator reservoir into a dissolved chemical reservoir, where the solution can be retained until it is withdrawn for end use or discarded.

Figure 1:
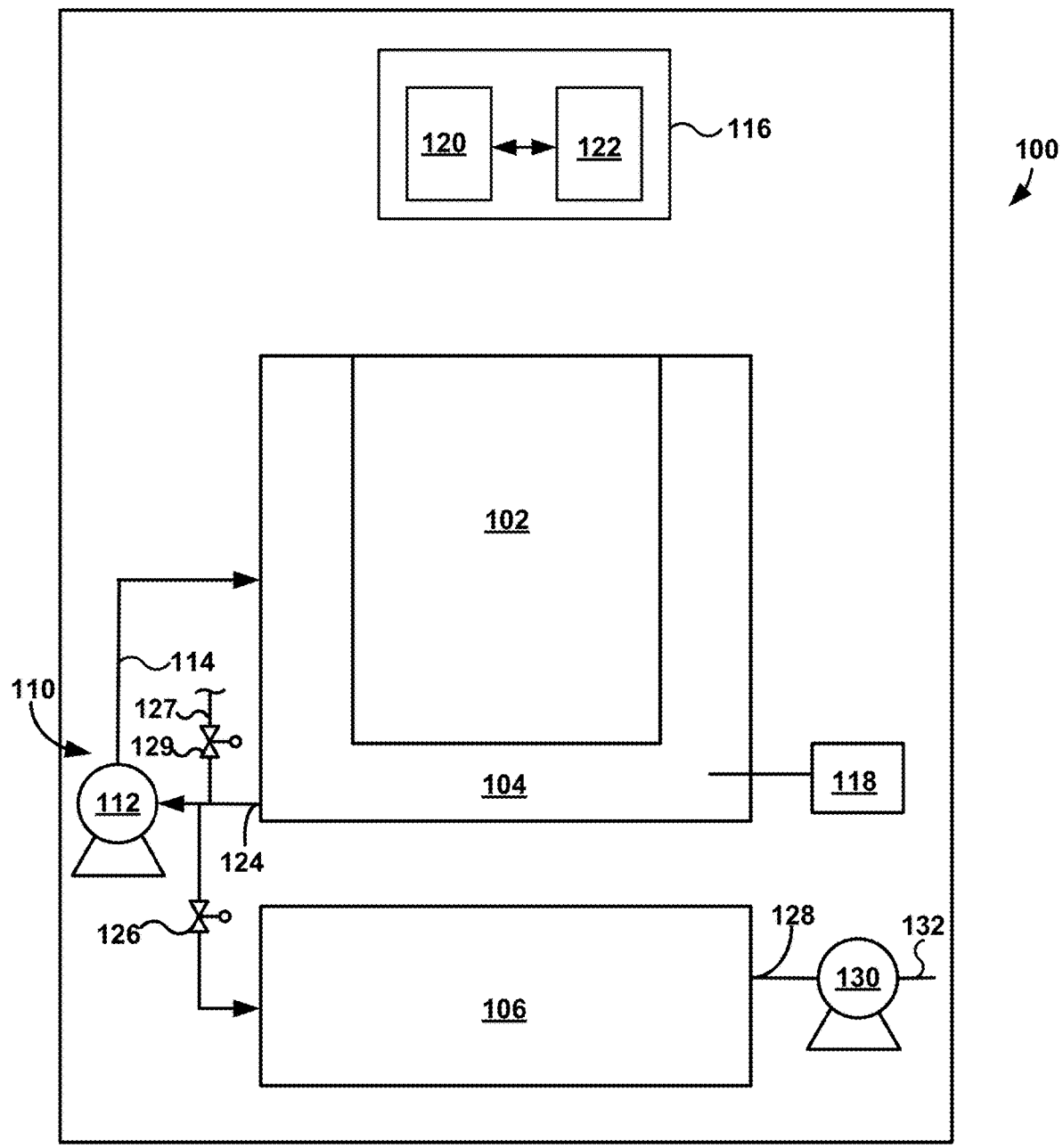
FIG. 1 is a conceptual diagram illustrating an example system for dissolving solid chemical.

FIG. 1 is a conceptual diagram illustrating an example system 100 for dissolving solid chemical. System 100 includes a solid chemical reservoir 102, a solution generator reservoir 104, and a dissolved chemical reservoir 106. System 100 can also include a recirculation circuit 110 that includes a recirculation pump 112 and a recirculation line 114 for recirculating diluent introduced into the solution generator reservoir to form a solution. In the illustrated example, system 100 also includes a controller 116 that can manage the overall operation of the system. One or more sensors 118 can provide feedback concerning the characteristics of the solution being formulated in solution generator reservoir 104.

Controller 116 can be communicatively connected to controllable components of system 100 (e.g., valves, pumps, sensors) and may send data and/or control signals to the components and/or receive data generated by the components during operation. Controller 116 can communicate with the various components via wired and/or wireless connections. Controller 116 includes processor 120 and memory 122. Memory 122 stores software for running controller 116 and may also store data generated or received by processor 120. Processor 120 runs software stored in memory 122 to manage the operation of system 100.

In operation, a user can introduce solid chemical to be dissolved into solid chemical reservoir 102. Solid chemical reservoir 102 may be sized to hold an amount of solid chemical suitable for forming multiple batches of solution. For example, solid chemical reservoir 102 may be filled periodically and multiple batches of solution generated and discharged to dissolved chemical reservoir 106 without needing to refill the solid chemical reservoir before each batch. Alternatively, solid chemical reservoir 102 may be filled before each batch of solution generated using system 100.

In either case, controller 116 can control system 100 to introduce diluent into solution generator reservoir 104. The diluent may be added through an opening 124 through which solution generated in solution generator reservoir 104 is subsequently withdrawn. Alternatively, a separate inlet opening may be provided to solution generator reservoir 104 through which diluent can enter the reservoir. Regardless, solid chemical reservoir 102 may be at least partially, and in some examples fully, contained within solution generator reservoir 104. As a result, diluent introduced into solution generator reservoir 104 can flow into solid chemical reservoir 102 via one or more openings in the solid chemical reservoir. As the diluent contacts and/or flows across solid chemical in the solid chemical reservoir, the solid chemical may erode or otherwise dissolve and enter the diluent, thereby forming a solution containing dissolved chemical.

Operating under the control of controller 116, recirculation circuit 110 can recirculate the diluent introduced into solution generator reservoir 104 to form a solution having a target concentration of dissolved chemical. For example, controller 116 may control system 100 (e.g., by controlling one or more valves and/or pumps controlling fluid communication between a diluent source and solution generator reservoir 104), to introduce a set volume of diluent into solution generator reservoir 104. The set volume of diluent introduced into solution generator reservoir 104 can correspond to a volume of solution desired to be formed for a particular batch. For example, the volume of diluent introduced into solution generator reservoir 104 may correspond to an amount of solution needed to refill dissolved chemical reservoir 106.

After introducing the desired amount of diluent into solution generator reservoir 104, controller 116 may control system 100 to cease delivering fresh diluent to the solution generator reservoir. Thereafter (or, concurrent with the introduction of diluent into the solution generator reservoir), controller 116 can control recirculation circuit 110 to recirculate the contents of solution generator reservoir 104. Recirculation pump 112 can withdraw the contents of solution generator reservoir 104 via opening 124, pressurizes the withdrawn liquid, and reintroduce the liquid into the solution generator reservoir via recirculation line 114. As the pressurized liquid is reintroduced into solution generator reservoir 104, at least some of the liquid may flow into solid chemical reservoir 102 and across solid chemical contained therein, dissolving additional solid chemical into the solution been formed. In this way, the recirculation action can cause the concentration of solid chemical dissolved in the solution being generated to progressively increase. Controller 116 can control recirculation circuit 110 to recirculate the contents of solution generator reservoir 104 until the solution has a target concentration of the solid chemical being dissolved in the solution. Sensor 118 may generate information indicative of the concentration of the solid chemical in the solution being formed to enable controller 116 to determine when to terminate recirculation action.

Upon reaching a target concentration, controller 116 can control system 100 to discharge the generated solution from solution generator reservoir 104 to dissolved chemical reservoir 106. Dissolved chemical reservoir 106 may be in selective fluid communication with solution generator reservoir 104 via opening 124 (or other opening providing fluid communication between the two reservoirs). For example, an electronically controllable valve 126 may be controlled by controller 116 to selectively open and close fluid communication between solution generator reservoir 104 and dissolved chemical reservoir 106. Controller 116 can control actuation of electronically controllable valve 126 to open fluid communication between the two reservoirs, allowing solution generated in solution generator reservoir 104 to flow to dissolved chemical reservoir 106.

In some configurations, dissolved chemical reservoir 106 is located at a vertically lower elevation with respect to ground then solution generator reservoir 104. As a result, solution generated in solution generator reservoir 104 can flow to dissolved chemical reservoir 106 under a force of gravity without providing a separate motive force to transport between the reservoirs. That being said, in some examples, system 100 includes a pump that is operable to transfer generated solution from solution generator reservoir 104 to dissolved chemical reservoir 106. Recirculation pump 112 or other pumping mechanism may be connected through an appropriate fluid conduit network to transfer solution generated in solution generator reservoir 104 to dissolved chemical reservoir 106.

Solution generated in solution generator reservoir 104 and transferred to dissolved chemical reservoir 106 can be retained in the dissolved chemical reservoir for any suitable amount of time. Solution can be withdrawn from dissolved chemical reservoir 106 as needed for use. Dissolved chemical reservoir 106 may include an outlet 128 through which solution retained in the reservoir is discharged. In some examples, system 100 includes a delivery pump 130 that receives solution in dissolved chemical reservoir 106 via outlet 128, pressurizes the solution, and discharges the solution via a discharge conduit 132. System 100 may include a separate delivery pump 130 from recirculation pump 112 for controlling delivery of solution from dissolved chemical reservoir 106, as illustrated in FIG. 1. Alternatively, system 100 may utilize the same pump 112 for performing both recirculation and downstream delivery. In these alternative configurations, an appropriate network of fluid conduits and/or valves may be provided to allow the pump to selectively operate in recirculation mode or discharge mode.

When configured with a separate recirculation pump 112 and delivery pump 130, the pumps may be selected to optimize the operating requirements of their respective tasks. For instance, in some examples, delivery pump 130 may be configured to operate at a higher pressure and lower volume then recirculation pump 112. That is, recirculation pump may operate to draw a higher volume of fluid from solution generator reservoir 104 for recirculation then the volume of fluid withdrawn and delivered by delivery pump 130. However, the pressure at which recirculation pump 112 discharges fluid may be less than the pressure at which delivery pump 130 discharges fluid. This arrangement may be useful to prevent recirculation of fluid via recirculation pump 112 from over eroding solid chemical in solid chemical reservoir 102. Further, the higher pressure delivered by delivery pump 130 may be useful to convey fluid from dissolved chemical reservoir 106 to a downstream discharge location.

During operation, controller 116 may receive a dispense request requesting preparation of a requested amount of a solution. The dispense request may be received in response to a user input, in response to information from a sensor indicating that additional solution is needed (e.g., a level sensor measuring the amount of solution present in dissolved chemical reservoir 106), and/or other information indicating that preparation of additional solution is required. The dispense request may specify a requested amount (e.g., volume or weight) of solution to be prepared, a requested concentration of a solid chemical to be dissolved in the solution to be prepared, and/or a requested compositional formulation for the solution to be prepared. From this information, controller 116 may determine a target amount of diluent to introduce into solution generator reservoir 104 and/or a target amount of solid chemical to be dissolved to achieve the target concentration requested. In some examples, controller 116 references formulation information stored in memory 122 associated with the controller to determine a target amount of diluent and/or solid needed to prepare the requested solution. The formulation information may be stored in the form of look-up tables, equations, ratios, or any other suitable form. Controller 116 can then control system 100 to prepare the requested solution based on the received and/or determined information.

For example, as discussed above, controller 116 can control system 100 to introduce the target amount of diluent into solution generator reservoir 104. Controller 116 may receive information from a sensor indicative of the amount of diluent added to solution generator reservoir 104 (e.g., volume/flow sensor, weight sensor, level sensor) to control addition of the diluent to achieve the target. After or concurrent with introducing the diluent into solution generator reservoir 104, controller 116 can control recirculation circuit 110 to recirculate the contents of solution generator reservoir 104 until the solution has a target concentration of the solid chemical in solid chemical reservoir 102 dissolved in the solution. Sensor 118 can generate information indicative of the concentration of the solid chemical in the solution being formed to enable controller 116 to determine when to terminate recirculation action. In different examples, sensor 118 may be implemented as a conductivity sensor that measures the conductivity of solution being formulated in solution generator reservoir 104, an optical sensor that measures the optical characteristics of the solution being formulated in solution generator reservoir 104, or a weight and/or volume sensor that measures the weight and/or volume of the contents in solution generator reservoir 104.

In any configuration, sensor 118 can measure a characteristic indicative of the amount of solid chemical that has eroded and entered the solution being generated, thereby providing a measure of the concentration of the solid chemical dissolved in the diluent. Controller 116 may control recirculation circuit 110 to terminate recirculation when information from sensor 118 indicates that the concentration of the solid chemical dissolved in the diluent has reached the target concentration. Thereafter, controller 116 can discharge the solution formed in solution generator reservoir 104 to dissolved chemical reservoir 106.

Independent of the specific amount and composition requested in a dispense request, controller 116 may receive a dispense request entered by a user and/or electronically stored in a memory. For example, a user may enter a dispense request specifying the amount of solution to be prepare and the concentration of the requested solution. As another example, controller 116 may store a programmed sequence of dispense requests to be prepared at certain times of day or in a predefined sequence. As another example, a dispense request may be automatically generated when it is determined that more solution is needed. For example, if solution is being drawn out of dissolved chemical reservoir 106 on an as-needed basis, an out-of-product sensor may detect when the reservoir is below a threshold (e.g., empty or nearing empty). The out-of-product sensor may then automatically generate a dispense request. Similarly, if dissolved chemical reservoir 106 is drawn in known quantities, a dispense request may be automatically generated after a certain number of draws known to empty the reservoir have occurred.

Controller 116 may also store one or more settings corresponding to preparations of multiple solutions, where each solution has a different formulation than each other solution. For example, settings required to prepare solutions of different volumes/concentrations/compositions may be stored for one or more chemical products including detergent, sanitizer, rinse agent, bleach, disinfectant, etc. Also, multiple different target concentrations may be stored for each agent depending upon the target solution being formulation. For example, cooling water biocides of different concentration may be required depending on the type and/or extent of biological contaminants in the cooling water.

Controller 116 may perform other control and monitoring functions within system 100, e.g., to generate a dispense request to initiate preparation of a given amount of solution having a target concentration of the solid chemical being dissolved. As one example, controller 116 may initiate a timer upon preparing a solution that counts the amount of time elapsed since the solution was prepared. With reference to time limits stored in memory, controller 116 may provide a user alert when the elapsed time has exceeded a threshold amount of time. In some examples, controller 116 controls system 100 to discharge and discard the contents of dissolved chemical reservoir 106 when the elapsed time has exceeded the threshold amount of time. Accordingly, for these configurations, system 100 may be in selective fluid communication with a drain where the contents of dissolved chemical reservoir 106 can be discarded. In some such examples, controller 116 may also automatically generate a fresh batch of solution in dissolved chemical reservoir 106 after discarding the prior batch. Different time limits may be stored in memory for different dilute chemical solutions. Example time limits may be, but are not limited to, 2 hours, 4 hours, 8 hours, 12 hours, 1 day, and 1 week, such as a time period ranging from 6 hours to 48 hours, or from 12 hours to 36 hours. Discarding old solution on a periodic basis may be helpful, e.g., to prevent bacterial growth in a solution and to ensure that desired chemistries in the solution are active, among other reasons.

Solid chemical reservoir 102, solution generator reservoir 104, and dissolved chemical reservoir 106 can have a variety of different configurations and arrangements, as discussed in greater detail with respect to FIGS. 2-5. In general, however, system 100 may be used to dissolve any desired type of solid chemical for a dilute liquid solution. Example solid chemicals that may be stored and dispensed using solid chemical reservoir 102 include, but are not limited to, an oxidizing biocide, a non-oxidizing biocide, a sanitizers, a sterilant, a cleaner, a degreaser, a lubricant, a detergent, a stain remover, a rinse agent, an enzyme, and the like. The solid chemical may be reactive with or inert to the diluent introducing into dissolved chemical reservoir 104. While the concentrated chemical introduced into solid chemical reservoir 102 is generally described herein as being in a completely solid state, in other applications, a pseudo-solid/liquid form, such as a gel or paste may be introduced into solid chemical reservoir 102.

In applications where the chemical is in a solid form, the solid chemical may be formed by casting, extruding, molding, and/or pressing. The solid chemical filling reservoir 102 may be structured as one or more blocks of solid chemical, a powder, a flake, a granular solid, or other suitable form of solid. Examples of solid product suitable for use in reservoir 102 are described, for example, in U.S. Pat. Nos. 4,595,520, 4,680,134, U.S. Reissue Pat. Nos. 32,763 and 32,818, U.S. Pat. Nos. 5,316,688, 6,177,392, and 8,889,048.

The diluent introduced into dissolved chemical reservoir is typically water (e.g., deionized water), although other liquid compounds that are desired to form a majority percentage of a dilute chemical solution can be used instead of water. When water is used as a diluent, the water may be delivered directly from a pressurized water main, for example without utilizing a diluent pump, by controlling a valve providing selective fluid communication. Additionally or alternatively, system 100 may include a diluent pump in fluid communication with a source of diluent to control addition of the diluent to solution generator reservoir 104. The example system of FIG. 1 illustrates a water line 127 in selective communication with opening 124 via a valve 129. Valve 129 can be communicatively coupled to controller 116, which can control addition of water to solution generator reservoir 104 by at least controlling valve 129.

Pumps 112 and 130 may each be any form of pumping mechanism that supplies fluid. For example, pumps 112 and 130 may comprise a peristaltic pump or other form of continuous pump, a positive-displacement pump, a centrifugal pump, or any other type of pump appropriate for the particular application. Components described as valves (126, 129) may be any device that regulates the flow of a fluid by opening or closing fluid communication through a fluid conduit. In various examples, a valve may be a diaphragm valve, ball valve, check valve, gate valve, slide valve, piston valve, rotary valve, shuttle valve, and/or combinations thereof. Each valve may include an actuator, such as a pneumatic actuator, electrical actuator, hydraulic actuator, or the like. For example, each valve may include a solenoid, piezoelectric element, or similar feature to convent electrical energy received from controller 116 into mechanical energy to mechanically open and close the valve. Each valve may include a limit switch, proximity sensor, or other electromechanical device to provide confirmation that the valve is in an open or closed position, the signals of which are transmitted back to controller 116. Fluid conduits and fluid lines in system 100 may be pipes or segments of tubing that allow fluid to be conveyed from one location to another location in the system. The material used to fabricate the conduits should be chemically compatible with the liquid to be conveyed and, in various examples, may be steel, stainless steel, or a polymer (e.g., polypropylene, polyethylene).

Figure 2:
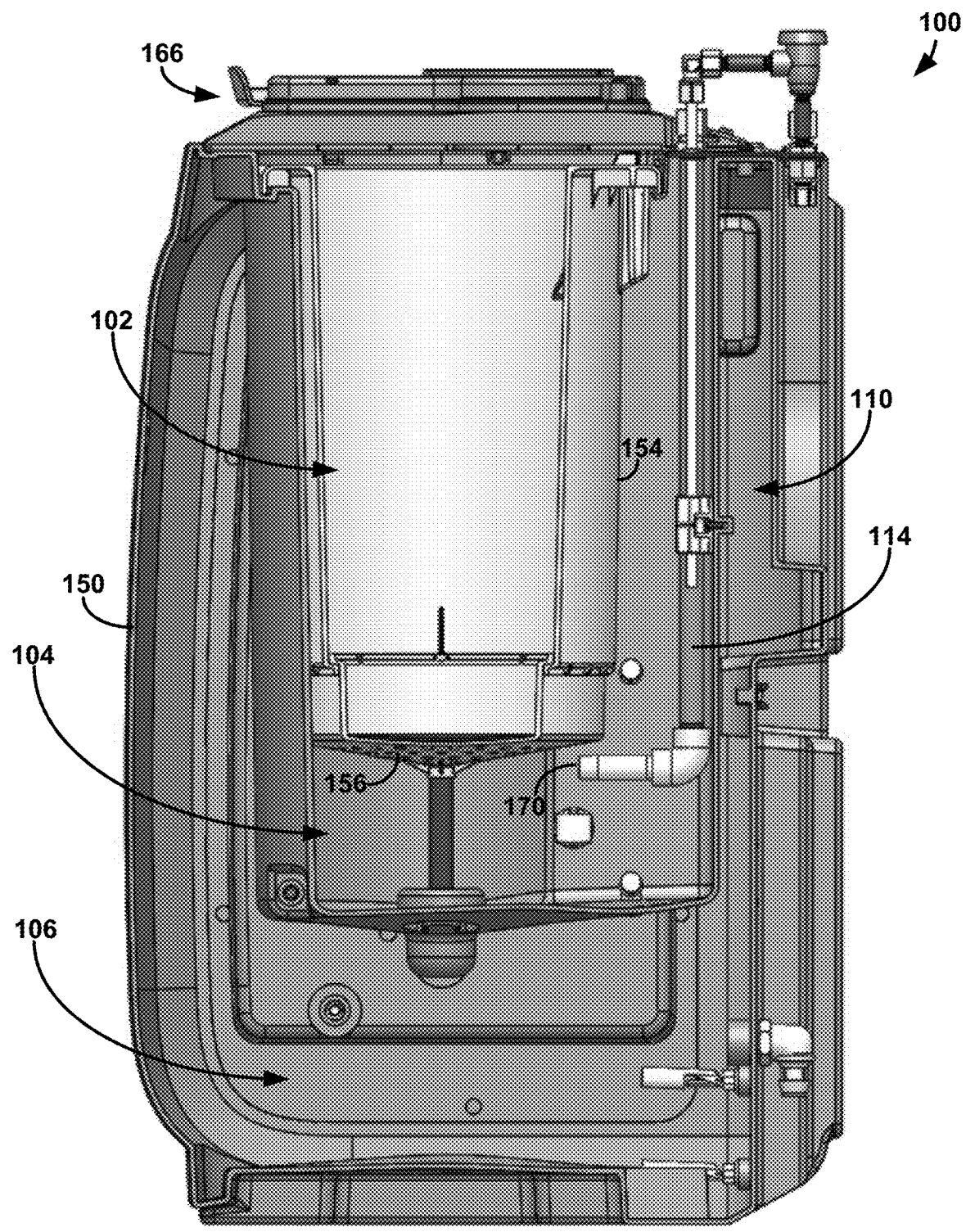
FIGS. 2 and 3 are different side sectional views of an example configuration of a system for dissolving solid chemical.
Figure 3:
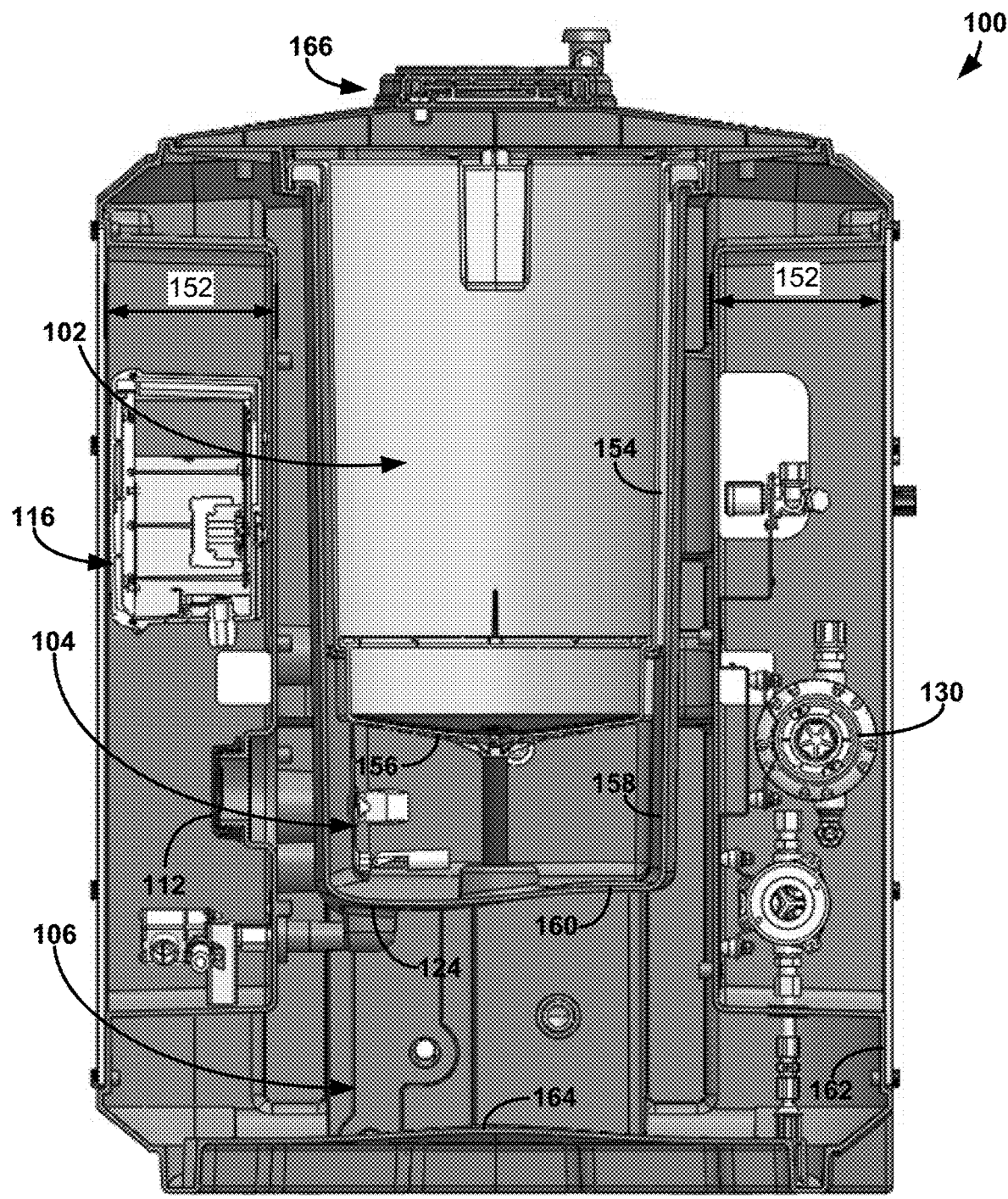

FIGS. 2 and 3 are different side sectional views of an example configuration of system 100 of FIG. 1 where like reference numerals refer to like features discussed above with respect to FIG. 1. As shown in the example of FIGS. 2 and 3, system 100 includes previously-described solid chemical reservoir 102, solution generator reservoir 104, and dissolved chemical reservoir 106. In this example, solid chemical reservoir 102, solution generator reservoir 104, and dissolved chemical reservoir 106 are vertically arranged and aligned relative to each other. Solid chemical reservoir 102 is positioned at least partially (and in some configurations fully) inside of solution generator reservoir 104, such that the bottom surface of the solid chemical reservoir is vertically elevated above the bottom surface of the solution generator reservoir. Further, dissolved chemical reservoir 106 is positioned underneath solution generator reservoir 104, such that the bottom surface of the solution generator reservoir is vertically elevated above the bottom surface of the dissolved chemical reservoir. This vertically arranged configuration of reservoirs may be useful to reduce the overall footprint of system 100, making the system convenient to deploy in space constrained locations. In alternative arrangements, however, other configurations may be used, such as where dissolved chemical reservoir 106 is arranged parallel to the length of solution generator reservoir 104 rather than underneath the solution generator reservoir.

To provide a modular system that is readily transported and installed, the various components of system 100 may be housed within a common generator housing 150 as illustrated on FIGS. 2 and 3. Housing 150 may define a cavity that contains solid chemical reservoir 102, solution generator reservoir 104, dissolved chemical reservoir 106, and optionally other operational components of the system. For example, recirculation circuit 110, including recirculation pump 112 and recirculation line 114, may be substantially and/or fully contained within housing 150. As another example, controller 116 and/or delivery pump 130 may be contained within housing 150. The reservoirs contained within housing 150 may be separately formed and incorporated into the cavity defined by the housing. Additionally or alternatively, housing 150 may form a boundary or wall surface of one or more of the reservoirs contained within the housing. For example, the illustrated configuration of FIGS. 2 and 3 shows housing 150 forming bottom and side wall surfaces that define dissolved chemical reservoir 106. That is, dissolved chemical reservoir 106 is a section of housing 150 underneath solution generator reservoir 104.

To provide space for housing various functional and/or operational components of system 100, a space 152 (FIG. 3) may be provided between the sidewall of solution generator reservoir 104 and the sidewall of housing 150. Space 152 may extend about an entire perimeter of housing 150 and solution generator reservoir 104. Alternatively, solution generator reservoir 104 may be offset from housing 150 on one side but not about an entire perimeter.

In general, solid chemical reservoir 102 may be any structure configured to contain solid chemical for dissolution within solution generator reservoir 104, while solution generator reservoir 104 may be any structure configured to receive and contain diluent that intermixes with the solid chemical to form a solution during use. Similarly, dissolved chemical reservoir 106 may be any structure configured to contain solution generated by dissolution of solid chemical in solid chemical reservoir 102 via the introduction of diluent into solution generator reservoir 104

Solid chemical reservoir 102 may be formed by at least one sidewall 154 extending vertically upwardly and a bottom wall 156 joining the sidewall. Solution generator reservoir 104 may also be formed by at least one sidewall 158 extending vertically upwardly and a bottom wall 160 joining the sidewall. Similarly dissolved chemical reservoir 106 may be formed by at least one sidewall 162 extending vertically upwardly and a bottom wall 164 joining the sidewall. The number of sidewalls interconnected together to form the side structure of each reservoir may vary depending on the shape of the reservoir. For example, a reservoir with a circular cross-sectional shape may be formed of a single sidewall whereas a reservoir with a square or rectangular cross-sectional shape may be defined by four interconnected sidewalls.

In general, each reservoir can define any polygonal (e.g., square, hexagonal) or arcuate (e.g., circular, elliptical) shape, or even combinations of polygonal and arcuate shapes. In the example of FIGS. 2 and 3, however, solid chemical reservoir 102, solution generator reservoir 104, and dissolved chemical reservoir 106 are each illustrated as having a generally circular cross-sectional shape. Each reservoir can be fabricated from a material that is chemically compatible with and chemically resistant to the type of solid chemical and/or solution to be present in the reservoir. In some examples, each reservoir is fabricated from a polymeric material, such as a molded plastic.

In some examples, the top end of solid chemical reservoir 102 and/or housing 150 may be completely closed by a top wall. The top wall may be removable or include an openable section to facilitate introduction of solid chemical into solid chemical reservoir 102. For example, system 100 may include a chemical dispensing docking station 166 positioned on a top surface of generator housing 150 over solid chemical reservoir 102. Chemical dispensing docking station 166 may be configured to engage an exterior container of solid chemical and include a movable element which, when opened, allows solid chemical to transfer from the external container into solid chemical reservoir 102. Additional details on an example docking station that can be used are described in a patent application entitled "PACKAGING AND DOCKING SYSTEM FOR NON-CONTACT CHEMICAL DISPENSING," which has attorney docket number 29805.348.1, the entire contents of which are incorporated herein by reference. In other examples, the top end of solid chemical reservoir 102 and/or housing 150 may be partially or fully open.

It should be appreciated that the descriptive terms "top" and "bottom" with respect to the configuration and orientation of components described herein are used for purposes of illustration based on the orientation in the figures. The arrangement of components in real world application may vary depending on their orientation with respect to gravity.

The size of solid chemical reservoir 102, solution generator reservoir 104, and dissolved chemical reservoir 106 may vary, for example, depending on the desired capacity of system 100. In some examples, solid chemical reservoir 102 has a length (e.g., from the top to bottom of sidewall 154) ranging from 30 cm to 60 cm. Solution generator reservoir 104 may have a length (e.g., from the top to bottom of sidewall 158) ranging from 50 cm to 80 cm. Further, dissolved chemical reservoir 106 may have a length (e.g., from the top to bottom of sidewall 162) ranging from 10 cm to 20 cm. During operation in these configurations, a fixed volume of diluent ranging from 15 liters to 30 liters may be introduced into solution generator reservoir 104 during the preparation of each batch of solution formed using the generator. It should be appreciated that the foregoing dimensions and volumes are merely examples, and a system in accordance with the disclosure is not limited in this respect.

To allow diluent introduced into solution generator reservoir 104 to interact with solid chemical contained in solid chemical reservoir 102, solid chemical reservoir 102 may contain pores or openings extending through a wall surface of the reservoir. For example, bottom wall 156 of solid chemical reservoir 102 may have one or more (e.g., a plurality) of apertures extending through the surface defining the wall. The apertures may allow diluent introduced into solution generator reservoir 104 to flow up into solid chemical reservoir 102, thereby wetting solid chemical in the solid chemical reservoir for forming the target solution. Additionally or alternatively, sidewall 154 of solid chemical reservoir may have one or more apertures extending through the surface defining the wall through which diluent (or solution being generated) can flow to interact with solid chemical in the reservoir. In one example configuration, sidewall 154 is solid (e.g., devoid of openings) while bottom wall 156 is a porous structure. This configuration can allow liquid to flow up into solid chemical in solid chemical reservoir 102 through the pores in bottom wall 156 but not through sidewall 154. This may be useful to limit the or extent to which solid chemical in the solid chemical reservoir 102 is wetted. Where solid chemical reservoir 102 is intended to hold an amount of chemical sufficient for multiple batches of solution, it can be useful to limit the liquid contact with the solid chemical in the reservoir so only solid chemical towards the bottom of the reservoir is wetted (e.g., bottom half, bottom third, bottom quarter, or bottom fifth when full of solid chemical) while solid chemical higher in the reservoir remains under wetted.

As noted above, recirculation circuit 110 may operate to recirculate liquid through solution generator reservoir 104 during the production of a batch of solution having a target concentration of the solid chemical being dissolved. Recirculation pump 112 can withdraw the contents of solution generator reservoir 104 via opening 124, pressurizes the withdrawn liquid, and reintroduce the liquid into the solution generator reservoir via recirculation line 114.

To achieve efficient and consistent solutions using system 100, in some examples, recirculation line 114 of recirculation circuit 110 has an outlet 170 aimed at the bottom wall 156 of solid chemical reservoir 102. This arrangement may cause liquid being recirculated through the circuit to flow at and/or against the bottom wall 156 upon being discharged from recirculation line 114 before contacting any other structure or wall surface inside solution generator reservoir 104.

Figure 4:
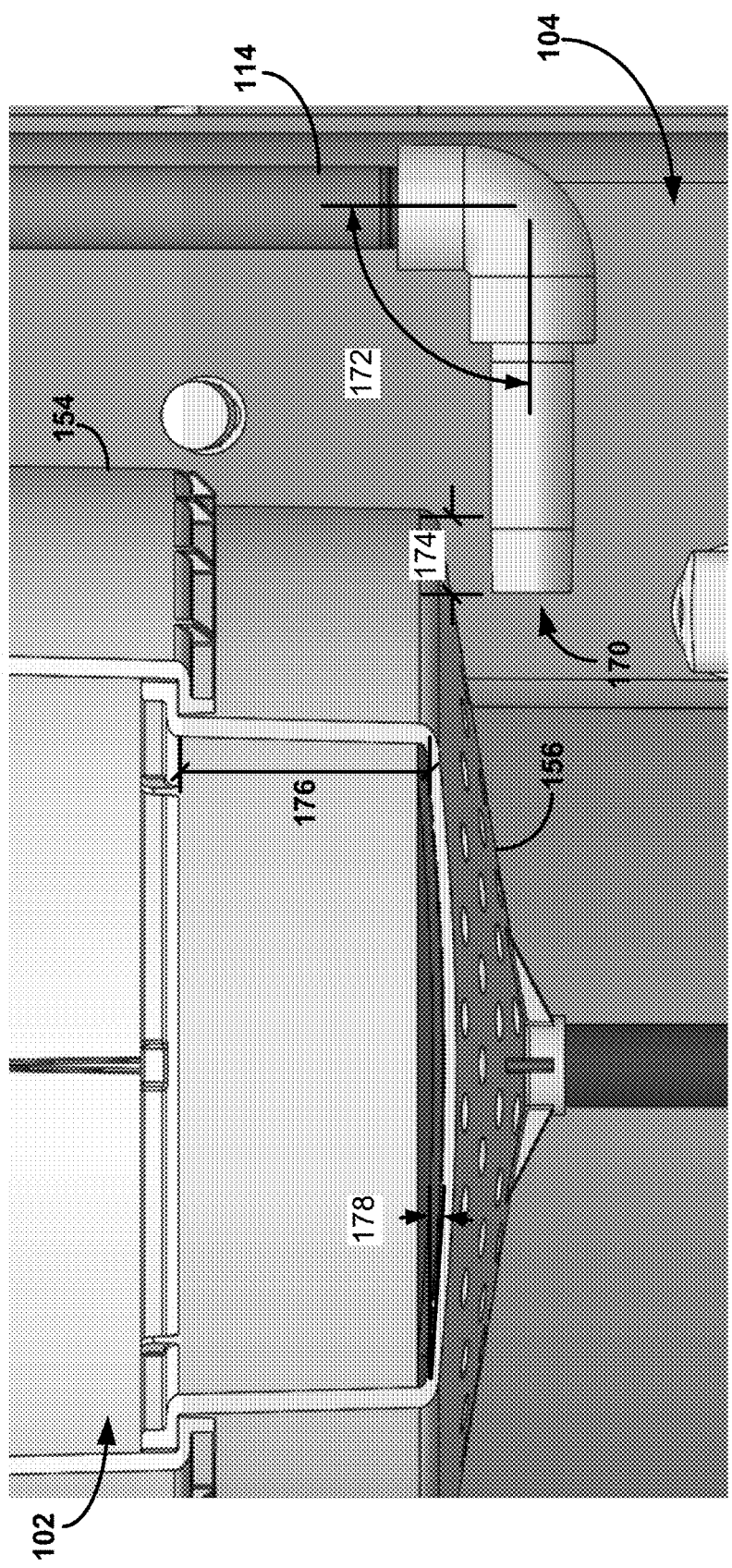
FIG. 4 is an expanded view of a portion of the system of FIGS. 2 and 3 showing an example configuration of features.

FIG. 4 is an expanded view of a portion of system 100 showing an example configuration of recirculation line 114 outlet 170 relative to the bottom wall 156 of solid chemical reservoir 102. In this example, recirculation line 114 extends vertically downward and parallel to sidewall 154 of solid chemical reservoir 102. A terminal or end portion of recirculation line 114 is then angled relative to a remainder of the recirculation line to change the flow direction of liquid discharging from the line to be aimed at solid chemical reservoir 102 and, more particularly in the example of FIG. 4, bottom wall 156. In different examples, the angle 172 at which the terminal end of recirculation line 114 bends relative to a remainder of the line to redirect outlet 170 may range from 30° to 150°, such as from 60° to 120°, or from 80° to 100°.

Outlet 170 of recirculation line 114 may be aimed at bottom wall 156 such that the outlet and the bottom wall are coplanar (e.g., in the X-Y plane indicated on FIG. 4). Liquid discharging from outlet 170 can flow linearly through a space in solution generator reservoir 104 between the outlet and bottom wall 156 before subsequently flowing against the bottom wall. At least a portion of the flow can enter solid chemical reservoir 102 through one or more pores in bottom wall 156 (when so configured), contacting solid chemical within solid chemical reservoir 102 and causing dissolution and/or erosion of the chemical.

To help efficiently direct fluid being recirculated at bottom wall 156 of solid chemical reservoir 102, the end of recirculation line 114 defining outlet 170 can extend across solution generator reservoir 104 toward bottom wall 156 (e.g., substantially perpendicular to sidewall 154 of solid chemical reservoir 102). In some configurations, such as that illustrated in FIG. 4, the terminal end of recirculation line 114 may extend under sidewall 154 of solid chemical reservoir 102 to position outlet 170 in close proximity to bottom wall 156. This arrangement may be useful to prevent fluid discharging from outlet 170 from dispersing in solution generator reservoir 104 upon discharge, helping to keep the discharging fluid focused on impinging upon bottom wall 156. As examples, the terminal end of recirculation line 114 may extend under sidewall 154 (and, therefore, a portion of bottom wall 156) a distance 174 ranging from 5 cm to 100 cm, such as from 10 cm to 75 cm.

The terminal end of recirculation line 114 defining outlet 170 may or may not narrow in cross-sectional area relative to a remainder of the recirculation line. For example, an end portion of recirculation line 114 that is offset by angle 172 relative to a remainder of the line may define a nozzle of smaller cross-sectional area than an upstream section of the recirculation line. Narrowing a portion of recirculation line 114 defining outlet 170 relative to a remainder of the line may be useful to increase the pressure with which fluid discharges from the recirculation line.

In operation, fluid introduced into solution generator reservoir 104 via inlet 124 (FIGS. 2 and 3) and/or outlet 170 of recirculation line 114 can enter solid chemical reservoir 102 via one or more apertures in bottom wall 156. As a result, liquid can flow into solid chemical reservoir 102 and wet solid chemical therein for dissolution and/or erosion. The amount of liquid introduced into solution generator reservoir 104 may be controlled so that some but not all of the solid chemical in solid chemical reservoir 102 is wetted during the generation of a batch of solution. This may allow the bottommost portion of solid chemical to be wetted while an uppermost portion of the solid chemical remains dry. As multiple batches of solution are created using the system, solid chemical higher in solid chemical reservoir 102 may move down the reservoir under a force of gravity as solid chemical lower the reservoir is dissolved. In some examples, the system is configured to introduce an amount of liquid into solution generator reservoir 104 effective to achieve a height of liquid 176 (measured from a terminal edge of sidewall 154 upwardly) ranging from 1 cm to 15 cm, such as from 3 cm to 10 cm.

In general, bottom wall 156 of solid chemical reservoir 102 may be a lowermost surface of the reservoir that retains solid chemical placed in the reservoir. In some examples, bottom wall 156 is flat or planar (e.g., in the X-Y plane indicated in FIG. 4). In other examples, bottom wall 156 is nonplanar, such as angled and/or curved. In the illustrated configuration of FIG. 4, bottom wall 156 is illustrated as having a conical shape that has an apex. Configuring bottom wall 156 to be angled may be useful for a variety of reasons. Angling the bottom wall may better align pores extending through the bottom wall with outlet opening 170 of recirculation line 114. This can help ensure that the solid product and diluent efficiently contact each other. Additionally or alternatively, angling the bottom wall 156 may help solid chemical present in solid chemical reservoir 102 to flow downwardly efficiently as the bottommost portion of the solid chemical is eroded. In some configurations, bottom wall 156 is angled at an angle 178 of at least 5 degrees, such as an angle ranging from 5 to 45 degrees, or from 10 degrees to 25 degrees.

When bottom wall 156 is configured with pores to allow fluid to flow from solution generator reservoir 104 up into solid chemical reservoir 102, the pores may be sized smaller than the cross-sectional area of the solid chemical intended to be placed in the reservoir. This can help prevent solid chemical from discharging through the pores without dissolving in the diluent introduced into solution generator reservoir 104. To help prevent dust, fines, and other particulate matter introduced into solid chemical reservoir 102 smaller than the average size of the bulk chemical placed in the reservoir from flowing out through the pores, a filtration layer may be placed over the bottom wall 156. The filtration layer may have pores of smaller cross-sectional area than the pores of bottom wall 156.

Figure 5:
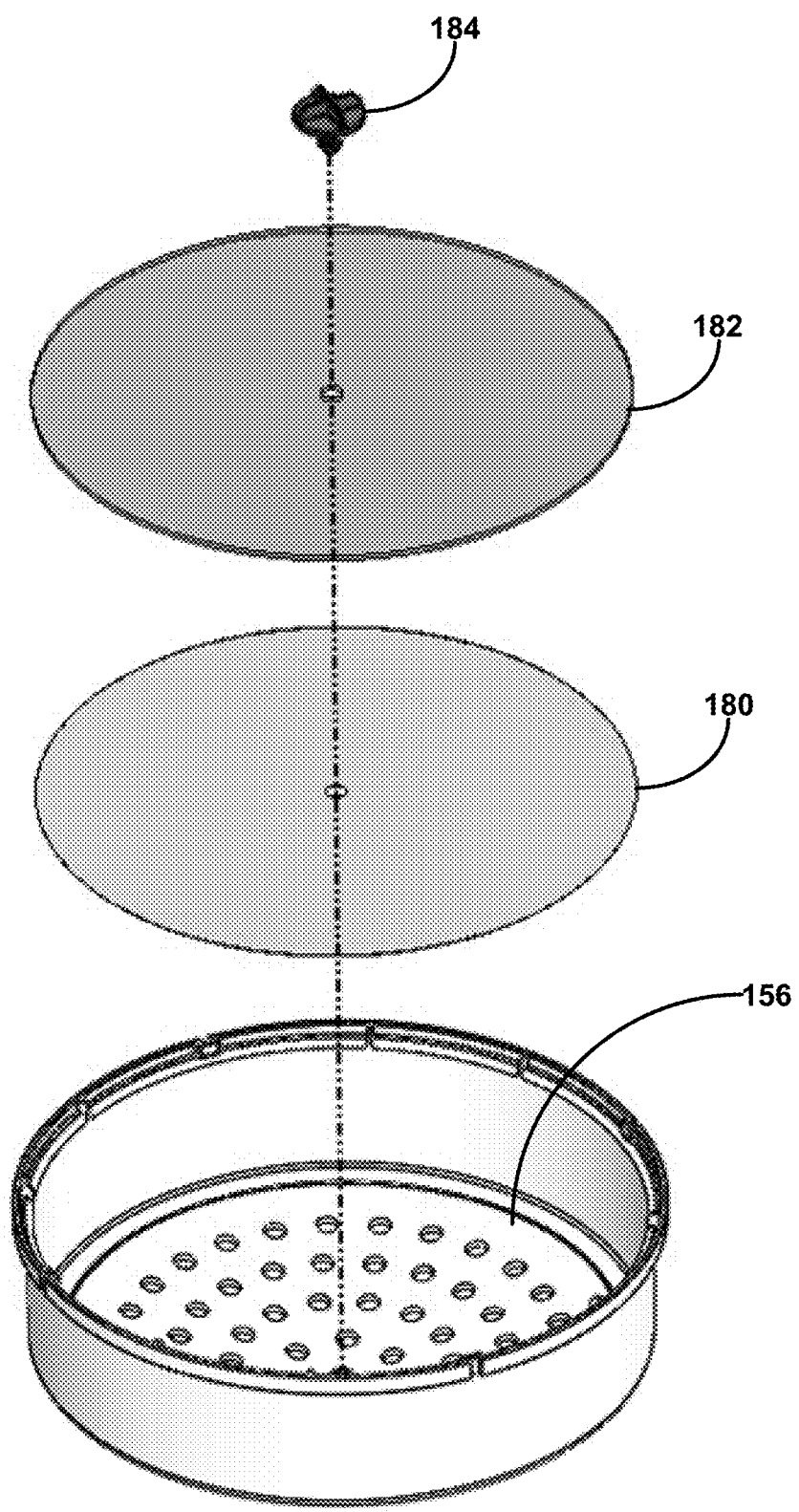
FIG. 5 is an exploded perspective view of an example configuration of a bottom wall of a solid chemical reservoir showing an example filter layer arrangement.

FIG. 5 is an exploded perspective view of an example configuration of bottom wall 156 of solid chemical reservoir 102 showing an example filter layer arrangement that may be used. In this example, at least one filter layer, which is illustrated as being implemented using two filter layers 180 and 182, is positioned on an inside surface of bottom wall 156 of solid chemical reservoir 102. The filter layers 180 and 182 may have different porosity or open area. For example, a first filter layer 180 may be a fine mesh with comparatively small pores, for example having a cross-sectional dimension ranging from 100 µm to 500 µm, such as from 200 µm to 400 µm. The second filter layer 182 may be a coarser mesh with comparatively larger pores, for example having a cross-sectional dimension ranging from 3000 µm to 6000 µm, such as from 4500 µm to 5500 µm. By contrast, the openings or pores extending through bottom wall 156 may have a cross-sectional dimension (e.g., diameter) ranging from 0.1 cm to 3 cm, such as from 0.75 cm to 1.25 cm. Thus, bottom wall 156 may be covered with one or more filter layers having a smaller open area and/or pores of smaller cross-sectional area than those extending through the bottom wall.

To secure the one or more filter layers to bottom wall 156, a retention clip (e.g., bolt, screw, or other mechanical fastener) 184 may be used.

Figure 6A:
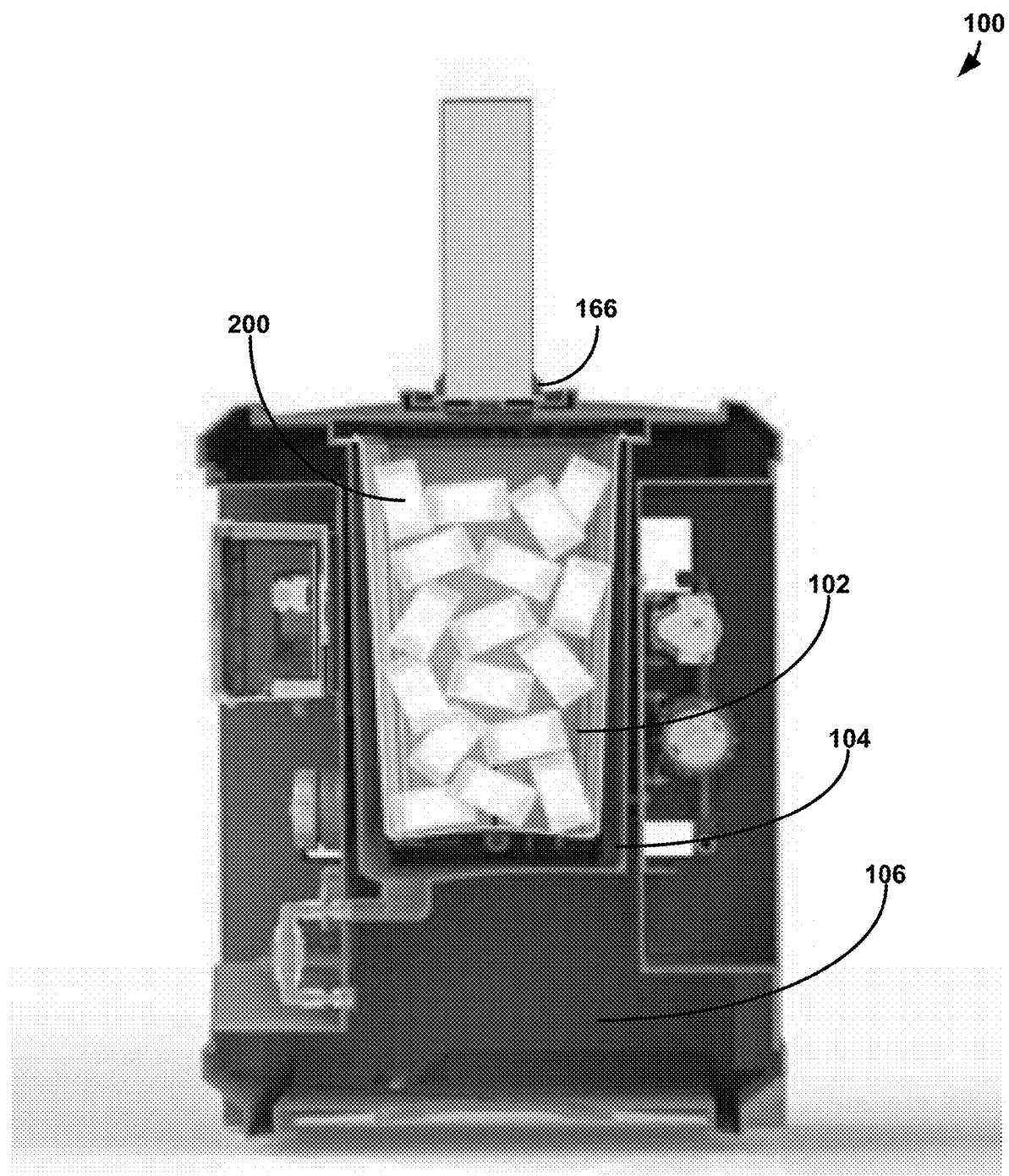
FIGS. 6A-6E are sectional illustrations of the example system of FIGS. 2 and 3 showing different example operational states of the system.
Figure 6B:
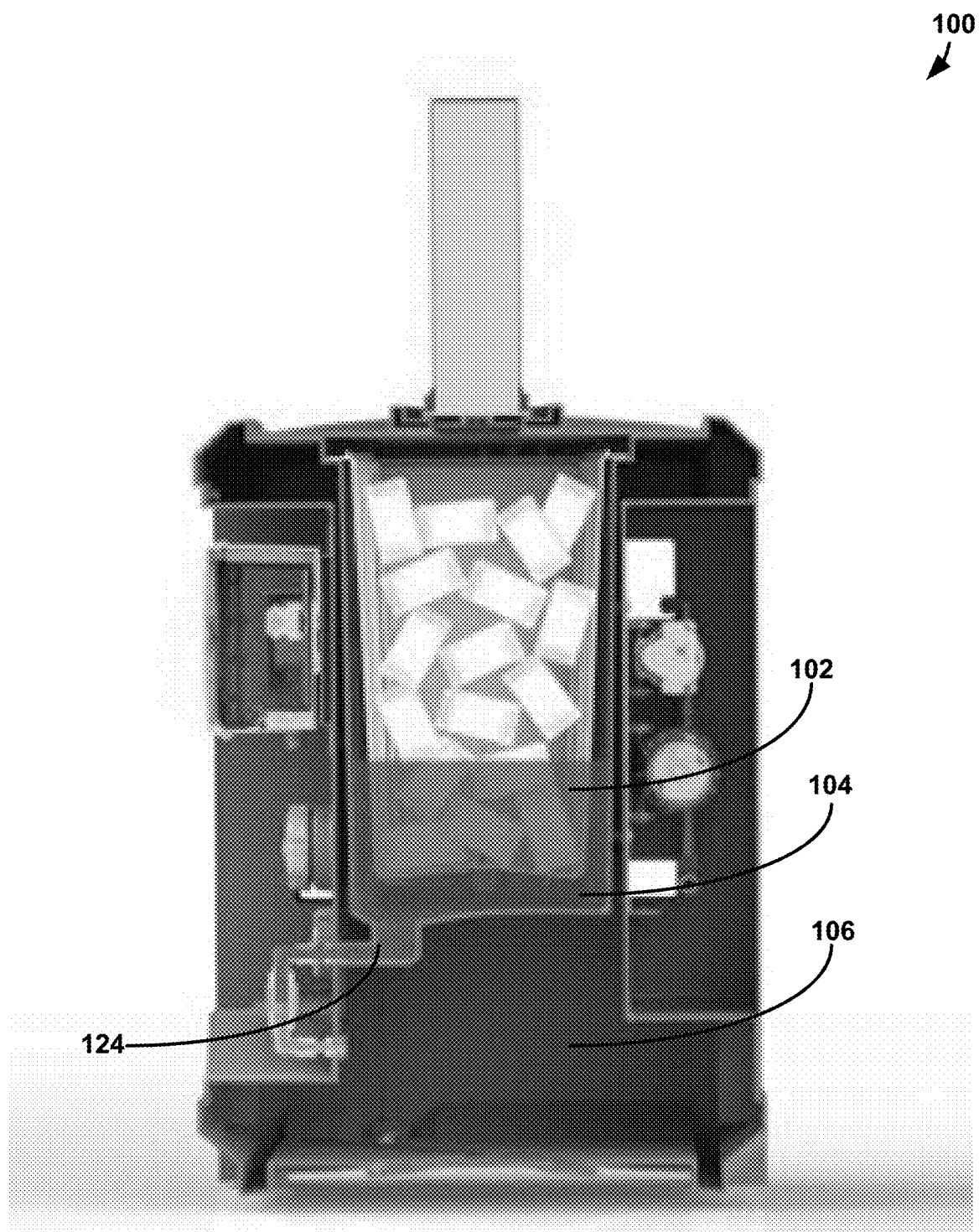

FIGS. 6A-6E are sectional illustrations of system 100 showing different example operational states of the system during production and discharge of a batch of solution. With reference to FIG. 6A, system 100 is shown with solid chemical 200 loaded into solid chemical reservoir 102 via docking station 166. Thereafter, as illustrated in FIG. 6B, diluent is introduced via opening 124 into solution generator reservoir 104. As the level of diluent introduced into solution generator reservoir 104 rises above the level of solid chemical reservoir 102, the diluent can flow into the solid chemical reservoir via one or more openings or pores in the solid chemical reservoir, such as through the bottom wall of the reservoir. After a fixed volume of diluent is introduced into solution generator reservoir 104 corresponding to the volume of solution intended to be produced for a particular batch, opening 124 may be closed (for example by actuating a valve), such that additional fresh diluent does not flow into the solution generator reservoir and the fixed volume of diluent remains in the reservoir.

Figure 6C:
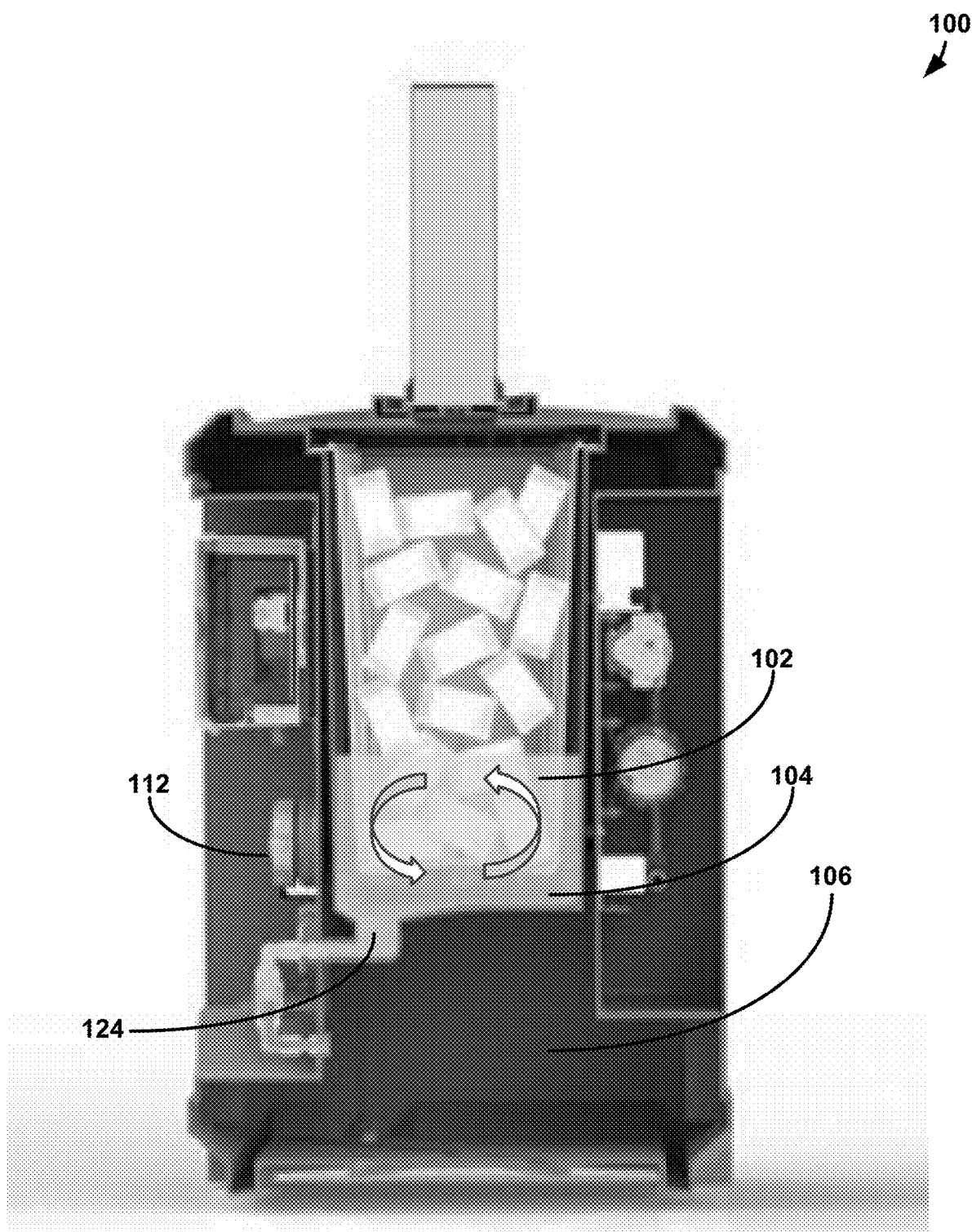

With reference to FIG. 6C, the diluent introduced into solution generator reservoir 104 is shown recirculating within the reservoir. The fluid may be withdrawn through opening 124 and pressurized via the recirculation pump before being reintroduced into the solution generator reservoir via the recirculation line, as discussed above. System 100 may continue to recirculate the fluid in solution generator reservoir 104 until a sensor associated with the system indicates that the concentration of the chemical being dissolved and/or eroded in the diluent has achieved a target concentration. System 100 may then terminate recirculation.

Figure 6D:
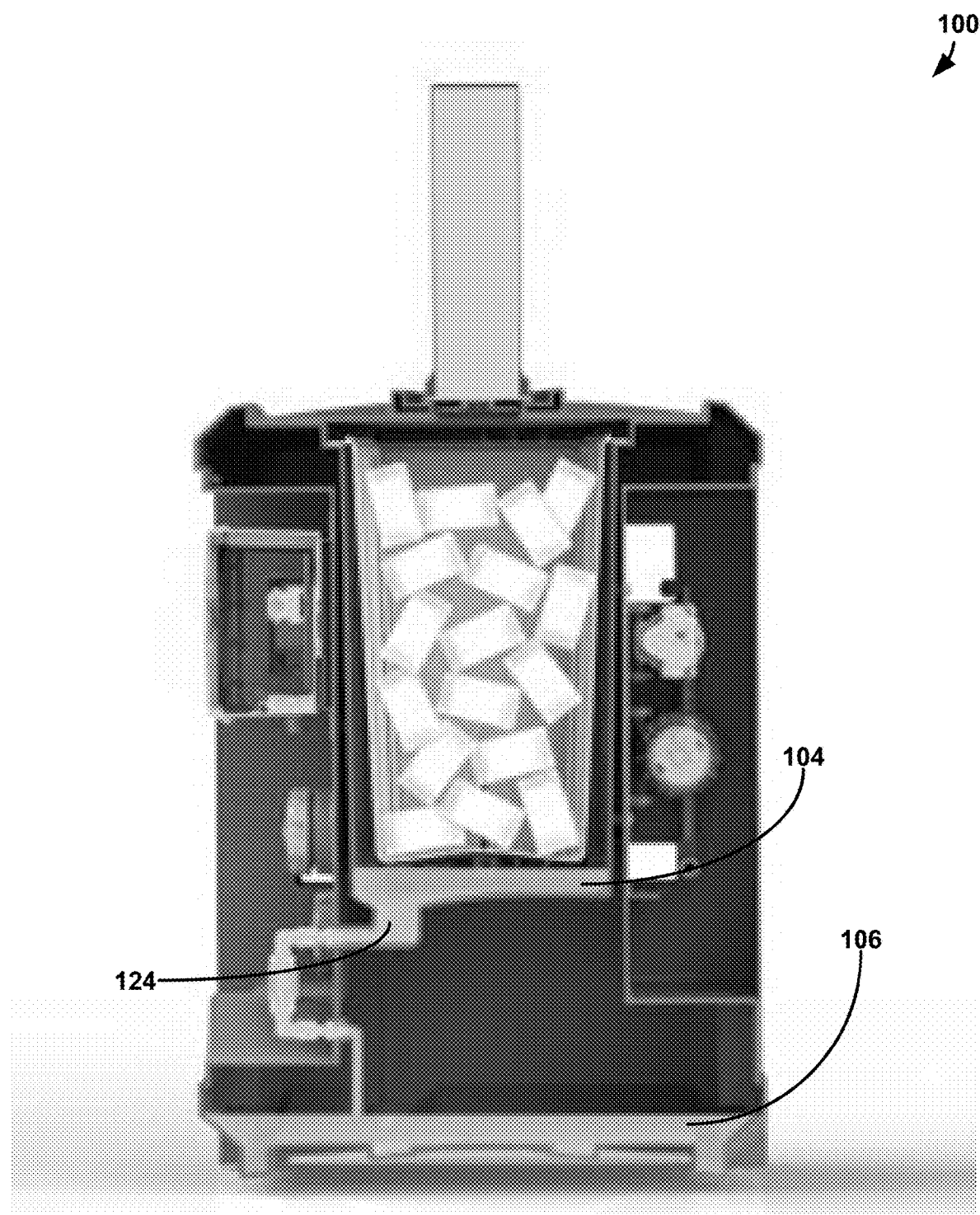
Figure 6E:
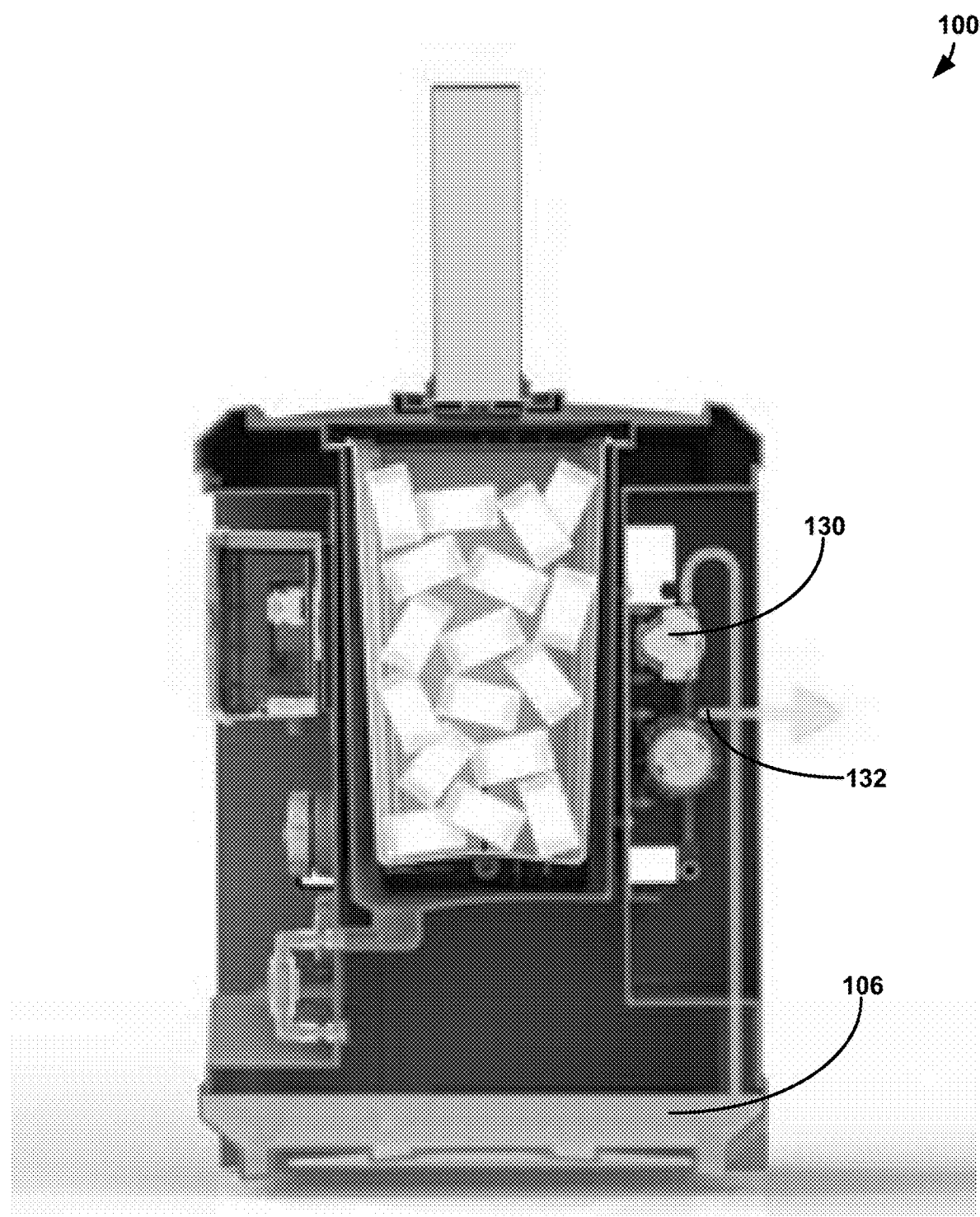

As shown in FIG. 6D, once a solution of appropriate concentration has been formed in solution generator reservoir 104, the solution may be discharged via opening 124 to dissolved chemical reservoir 106. The solution may remain in the dissolved chemical reservoir 106 until being withdrawn, for example on demand, for downstream use and/or until the solution is discharged, for example as being expired. FIG. 6E illustrates delivery pump 130 delivering solution from dissolved chemical reservoir 106 through discharge conduit 132.

A system for dissolving solid chemical according to disclosure can provide an efficient and compact arrangement that can generate consistent and accurate liquid chemical solutions from concentrated solid product.

The techniques described in this disclosure, including functions performed by a controller, control unit, or control system, may be implemented within one or more of a general purpose microprocessor, digital signal processor (DSP), application specific integrated circuit (ASIC), field programmable gate array (FPGA), programmable logic devices (PLDs), or other equivalent logic devices. Accordingly, the terms "processor" or "controller," as used herein, may refer to any one or more of the foregoing structures or any other structure suitable for implementation of the techniques described herein.

The various components illustrated herein may be realized by any suitable combination of hardware, software, and firmware. In the figures, various components are depicted as separate units or modules. However, all or several of the various components described with reference to these figures may be integrated into combined units or modules within common hardware, firmware, and/or software. Accordingly, the representation of features as components, units or modules is intended to highlight particular functional features for ease of illustration, and does not necessarily require realization of such features by separate hardware, firmware, or software components. In some cases, various units may be implemented as programmable processes performed by one or more processors or controllers.

Any features described herein as modules, devices, or components may be implemented together in an integrated logic device or separately as discrete but interoperable logic devices. In various aspects, such components may be formed at least in part as one or more integrated circuit devices, which may be referred to collectively as an integrated circuit device, such as an integrated circuit chip or chipset. Such circuitry may be provided in a single integrated circuit chip device or in multiple, interoperable integrated circuit chip devices.

If implemented in part by software, the techniques may be realized at least in part by a computer-readable data storage medium (e.g., a non-transitory computer-readable storage medium) comprising code with instructions that, when executed by one or more processors or controllers, performs one or more of the methods and functions described in this disclosure. The computer-readable storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), embedded dynamic random access memory (eDRAM), static random access memory (SRAM), flash memory, magnetic or optical data storage media. Any software that is utilized may be executed by one or more processors, such as one or more DSP's, general purpose microprocessors, ASIC's, FPGA's, or other equivalent integrated or discrete logic circuitry.

Various examples have been described. These and other examples are within the scope of the following claims.

The invention claimed is:

1. A system for dissolving solid chemical comprising:
   a solid chemical reservoir configured to receive solid chemical to be dissolved, the solid chemical reservoir have a porous bottom wall and at least one sidewall extending vertically upwardly from the porous bottom wall;
   a solution generator reservoir surrounding the porous bottom wall and at least a portion of the sidewall of the solid chemical reservoir, the solution generator reservoir having an opening through which dissolved chemical generated in the solution generator reservoir is configured to be discharged;
   a dissolved chemical reservoir in selective fluid communication with the solution generator reservoir via the outlet opening;
   a recirculation circuit that includes a recirculation pump and a recirculation line having an outlet aimed at the porous bottom wall, the pump being configured to draw fluid from the solution generator reservoir and discharge the fluid through the outlet of the recirculation line; and
   a controller configured to:
      control addition of water to the solution generator reservoir at least until the porous bottom wall of the solid chemical reservoir is submerged in the water;
      control the recirculation circuit to recirculate fluid in the solution generator reservoir to generate a solution having a target concentration of the solid chemical via erosion of solid chemical in the solid chemical reservoir; and
      control discharge of the solution to the dissolved chemical reservoir.

2. The system of claim 1, further comprising a delivery pump configured to draw solution from the dissolved chemical reservoir and deliver pressurized solution, wherein the delivery pump is configured to operate at a higher pressure and lower volume than the recirculation pump.

3. The system of claim 1, further comprising a generator housing in which the solid chemical reservoir, the solution generator reservoir, the dissolved chemical reservoir, and the recirculation circuit are provided, wherein the solid chemical reservoir and the solution generator reservoir are positioned over a top surface of the solution generator reservoir.

4. The system of claim 3, wherein
   the solution generator reservoir has a bottom wall and at least one sidewall defining a cavity into which the solid chemical reservoir is inserted, and
   the sidewall of the solution generator reservoir is offset from the generator housing to define a space in which the recirculation pump is positioned.

5. The system of claim 3, further comprising a chemical dispensing docking station positioned on a top surface of the generator housing over the solid chemical reservoir.

6. The system of claim 1, wherein the outlet of the recirculation line is positioned under the sidewall of the solid chemical reservoir.

7. The system of claim 1, wherein the outlet of the recirculation line is positioned co-planar with the porous bottom wall of the solid chemical reservoir.

8. The system of claim 1, wherein the porous bottom wall has a conical shape.

9. The system of claim 1, further comprising at least one filter layer secured to the porous bottom wall of the solid chemical reservoir.

10. The system of claim 1, wherein the opening of the solution generator reservoir is in selective fluid communication to a water line via a valve and the controller is configured to control addition of water through the opening by controlling the valve.

11. The system of claim 1, further comprising a sensor configured to generate information indicative of the concentration of the solid chemical in the fluid, wherein the controller is configured to control the recirculation circuit to terminate recirculation of fluid in the solution generator reservoir when information received from the sensor indicates that the fluid has reached the target concentration.

12. The system of claim 1, wherein the controller is configured to discharge solution in the dissolved chemical reservoir after the solution has been in the dissolved chemical reservoir a threshold amount of time and generate a fresh batch of the solution.

13. A method comprising:
   introducing water into a solution generator reservoir that surrounds a porous bottom wall and at least a portion of a sidewall of a solid chemical reservoir containing solid chemical to be dissolved until a height of water in the solution generator reservoir wets some but not all of the solid chemical in the solid chemical reservoir;
   recirculating fluid in the solution generator reservoir by drawing fluid out of the solution generator reservoir with a pump and reintroducing the fluid into the solution generator reservoir through a recirculation line having an outlet aimed at the porous bottom wall of the solid chemical reservoir, wherein fluid is recirculated until a solution having a target concentration is generated via dissolution of solid chemical in the solid chemical reservoir;

discharging the solution from the solution generator reservoir into a dissolved chemical reservoir.

14. The method of claim 13, further comprising drawing solution from the dissolved chemical reservoir with a delivery pump and delivering pressurized solution, wherein the delivery pump operates at a higher pressure and lower volume than the pump used to recirculate fluid.

15. The method of claim 13, further comprising a generator housing in which the solid chemical reservoir, the solution generator reservoir, the dissolved chemical reservoir, and the pump are provided, wherein the solid chemical reservoir and the solution generator reservoir are positioned over a top surface of the solution generator reservoir and discharging the solution from the solution generator reservoir into the dissolved chemical reservoir comprises conveying the solution vertically downwards from the solution generator reservoir into the dissolved chemical reservoir within the generator housing.

16. The method of claim 15, further comprising engaging a reservoir containing chemical to be added to the solid chemical reservoir with a chemical dispensing docking station positioned on a top surface of the generator housing, and opening the reservoir to add the solid chemical to the solid chemical reservoir.

17. The method of claim 13, wherein the outlet of the recirculation line is positioned under the sidewall of the solid chemical reservoir.

18. The method of claim 13, wherein the outlet of the recirculation line is positioned co-planar with the porous bottom wall of the solid chemical reservoir.

19. The method of claim 13, further comprising
measuring information indicative of the concentration of the solid chemical in the fluid, and
terminating recirculation of the fluid based on received information indicating that the fluid has reached the target concentration.

20. The method of claim 13, wherein introducing water into the solution generator reservoir comprises introducing water through an opening in the solution generator reservoir, and discharging the solution from the solution generator reservoir into the dissolved chemical reservoir comprises discharging the solution through the same opening in the solution generator reservoir through which water was introduced.

* * * * *